Feb. 28, 1950  E. P. KINNE  2,498,958
COUPLER
Filed Dec. 28, 1945  5 Sheets-Sheet 1

INVENTOR.
Edmund P. Kinne,
BY
Atty.

Feb. 28, 1950     E. P. KINNE     2,498,958
COUPLER Filed Dec. 28, 1945     5 Sheets-Sheet 2

INVENTOR.
Edmund P. Kinne
BY
Atty.

Feb. 28, 1950     E. P. KINNE     2,498,958
COUPLER Filed Dec. 28, 1945     5 Sheets-Sheet 3

INVENTOR.
Edmund P. Kinne,
BY
Wm O. Garner
Atty.

Feb. 28, 1950      E. P. KINNE      2,498,958
COUPLER Filed Dec. 28, 1945      5 Sheets-Sheet 5

INVENTOR.
Edmund P. Kinne,
BY
Atty.

Patented Feb. 28, 1950

2,498,958

UNITED STATES PATENT OFFICE 2,498,958

COUPLER

Edmund P. Kinne, Alliance, Ohio, assignor to American Steel Foundries, Chicago, Ill., a corporation of New Jersey Application December 28, 1945, Serial No. 637,524

32 Claims. (Cl. 213—148)

My invention relates to car couplers and more particularly to improvements in automatic couplers of the A. A. R. Standard types having bottom rotary lock-operating mechanisms.

One of the difficulties experienced with Standard A. A. R. couplers of the type described is accidental uncoupling causing a train parting. This difficulty is in a large part attributable to the bouncing action of the cars, due to the high speeds of modern freight train operations. Another cause is the end shock produced by the slack between cars running in. Either of these conditions, or a combination of both, may cause release of the present "anticreep," and raising of the lock to unlocked position, resulting in a train parting causing damage and costly delays.

The anticreep in the present A. A. R. coupler depends entirely on gravity to hold it in engagement, making it subject to external forces such as later cause its failure to function, and is therefore not positive in its action.

An object of my invention is to provide positive means for holding the lock down when in coupled and in locked position and maintaining this condition until release of the lock is desirable.

The main object of my invention is to provide positive means in a "lock-to-the-lock" designed to hold the lock down when in coupled and locked position, and maintaining this condition until released manually by the train man.

Another object is to retain the present anticreep of the A. A. R. coupler, supplementing it with additional positive means for holding the lock in locked position.

Still another object of the invention is to combine the releasing of the lock-to-the-lock and raising the lock to the lock-set position into one operation of rotating the outboard handle of the uncoupling rod attached to the rotor in the coupler.

A further object of the invention is to provide additional positive means for supplementing gravity to hold the lock-to-the-lock in engagement.

A still further object is to facilitate the dropping of the lock to lockset position by supplemental means which also serves to hold the lock-to-the-lock in engagement.

Another object is to provide a novel telltale means to indicate that the lock is in locked position, and that the lock-to-the-lock is functioning.

My invention comprehends an improved bottom rotary lock-operating mechanism comprising a rotor operatively connected to the lock and having means engageable with the coupler for preventing the rotor from turning and the coupler unlocking, resilient means being associated with the rotor for maintaining the same in locked position and acting to hold the locking parts in their locked down position.

Describing in detail my novel coupler structure and referring first to Figures 1-4 inclusive, the coupler comprises the usual coupler head generally designated 2 and integrally formed with the shank 4, of which a fragmentary portion only is shown. The coupler head comprises the usual guard arm portion 6 and the knuckle 8 which may be pivoted at 10 for automatic action in well known manner and which may be locked in engagement with an associated coupler by means of the lock 12, said lock being adapted to be raised out of locking engagement with the knuckle 8 or to be lowered into said engagement in well known manner. The knuckle 8 and lock 12 are operatively associated with a knuckle thrower (not shown) in usual manner. The above described and illustrated coupler construction is well known to those skilled in the art as of Standard A. A. R. type and for that reason is believed to be sufficiently explanatory for relating the structure and operation of the bottom rotary lock-operating mechanism hereinafter described and to which my invention is directed.

The coupler head 2 is formed at the bottom thereof with a front wall 14 disposed transversely in position intermediate the ends thereof to reinforce the guard arm and knuckle sides of the coupler, said wall 14 having the spaced parallel side walls 16 and 18 merging therewith and defining a pocket or housing 20 receiving the bottom rotary lock-operating mechanism and serving to protect the same against injury by flying objects which might strike the mechanism.

Figure 1:
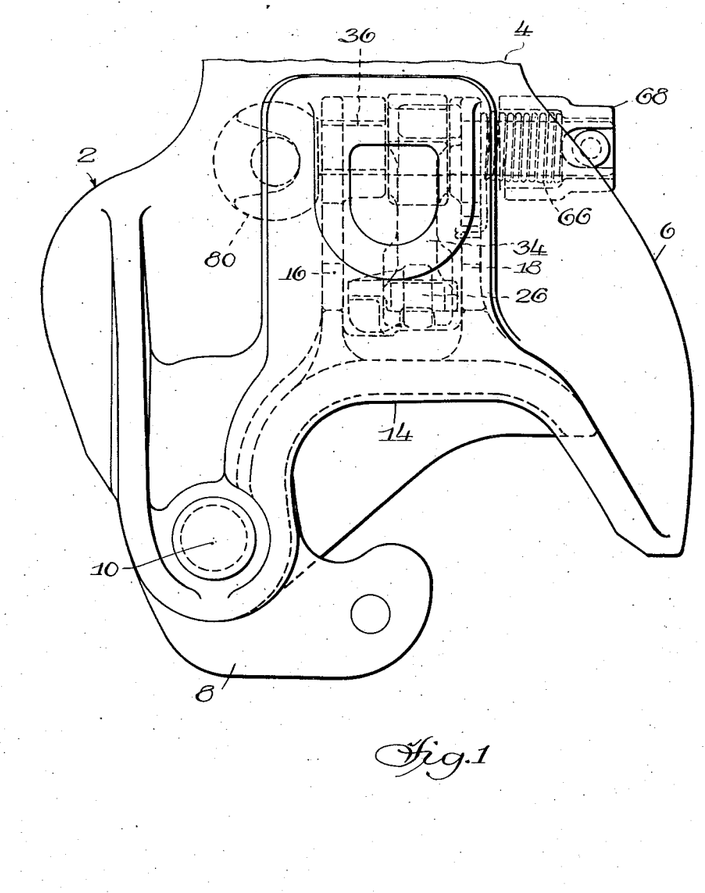
Figure 1 is a top plan view of a coupler embodying my invention, showing the coupler with the lock-to-the-lock in locked position.
Figure 2:
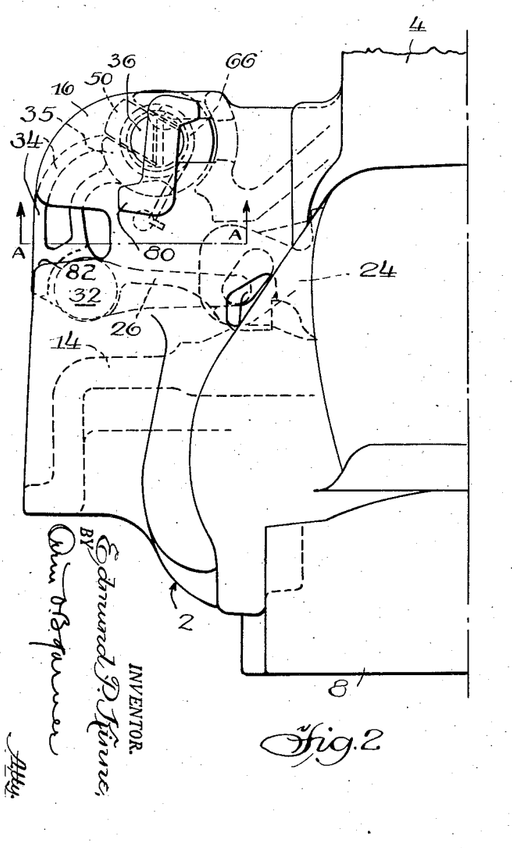
Figure 2 is a fragmentary side elevation of the coupler shown in Figure 1, taken from the knuckle side thereof.
Figure 3:
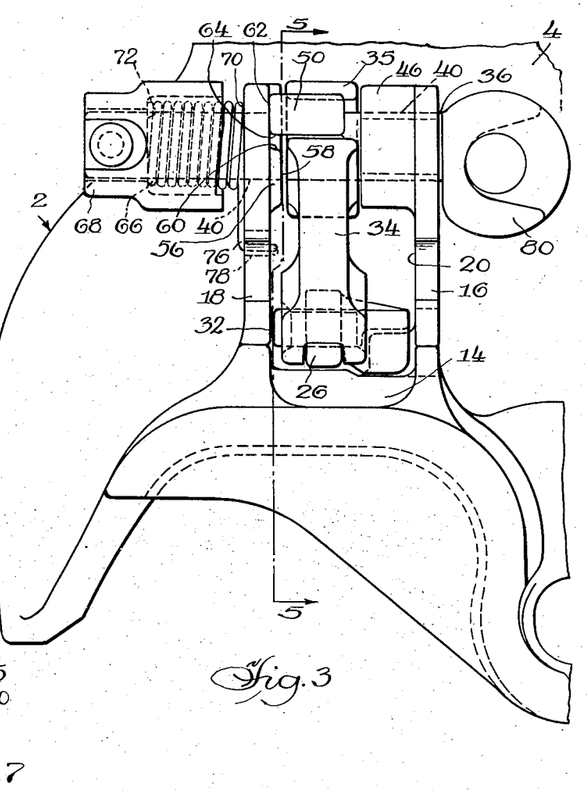
Figure 3 is a fragmentary bottom view of the coupler.
Figures 4, 7:
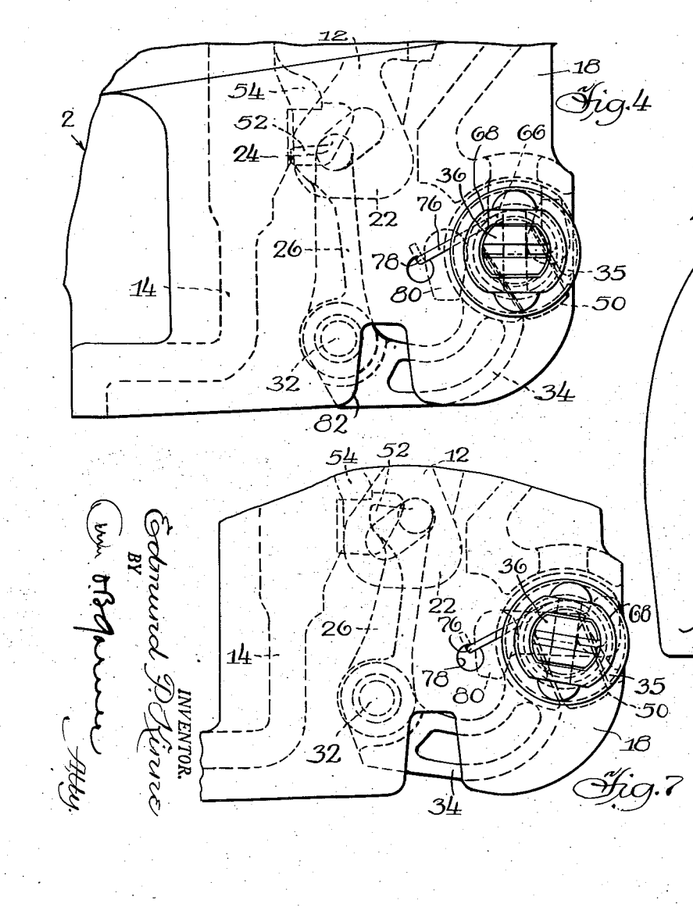
Figure 4 is a fragmentary side elevation of the coupler shown in Figure 1, taken from the guard arm side thereof.
Figures 6 and 7 are further fragmentary views similar to Figure 4 and showing the lock-to-the-lock in unlocked position.
Figure 8:
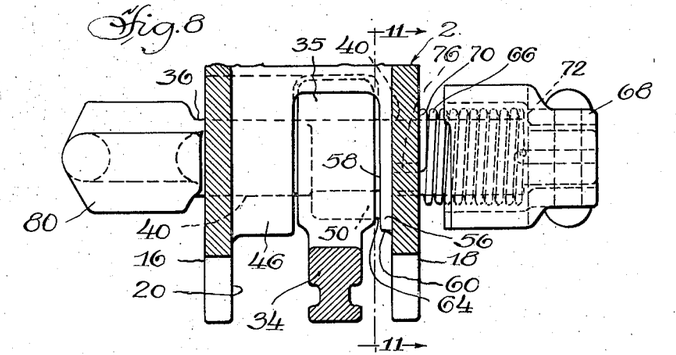
Figures 8, 9 and 10 are sectional views taken in the transverse vertical plane indicated by the line A—A of Figure 2, Figure 8 showing the lock-to-the-lock in locked position, Figure 9 showing the rotor moved to the left thus disengaging the lock-to-the-lock and permitting rotation of the rotor assembly to raise the lock to unlock the knuckle, and Figure 10 showing the lock-to-the-lock released and the rotor rotated to raise the lock.
Figure 13:
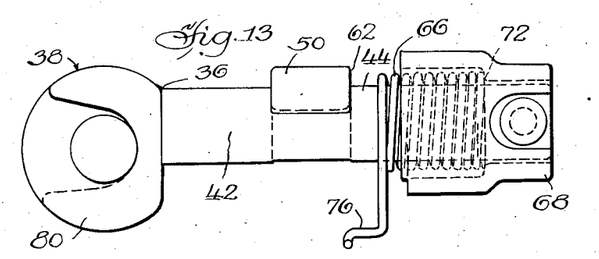
Figures 13 and 14 are side and end elevations respectively of the rotor assembly.

Referring now to Figures 4-9 inclusive, the leg 22 of the lock 12 projects within the pocket 20 and the upper trunnion 24 of the toggle or link 26 is disposed within the slot 28 in the lock leg 22, the lower bearing 30 of the link being pivotally connected by a pin 32 to one end of the lock-operating or lifter lever or arm 34. The opposite end of the lever 34 is formed with a downwardly opening jaw or hook portion 35 receiving a rotor shaft 36 of a rotor assembly generally designated 38 and shown in Figure 13, said shaft being journaled in the side walls 16 and 18 of the coupler casting as at 40, as hereinafter described and as shown in Figures 3, 4 and 8.

The rotor assembly 38 comprises the rotor shaft 36 having the spaced journal portions 42 and 44, and it may be noted that the side wall 16 is formed with a laterally extending bearing portion 46 receiving the journal portion 42 of the shaft, and the journal portion 44 is received within the wall 18 for bearing engagement therewith. Disposed between the journal portions 42 and 44 is an outwardly projecting lug 50 formed integral with the central portion of the shaft and received with the shaft within the jaw 35 of the lever 34 for interlocking engagement therewith as shown in Figures 2, 5, 10 and 11. It will be apparent that rotation of the shaft 36 will cause rotation of the lever 34.

Figure 5:
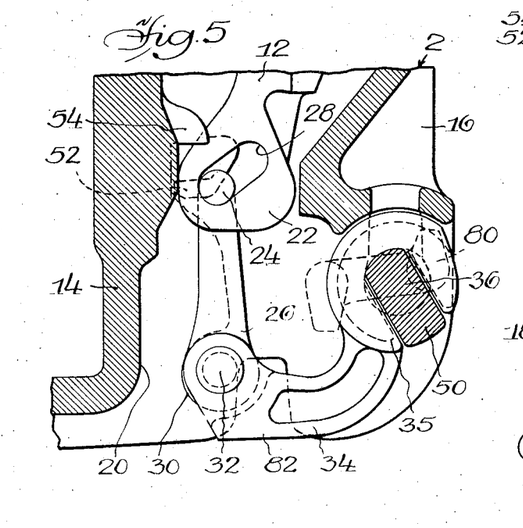
Figure 5 is a fragmentary sectional view taken in the vertical longitudinal planes indicated by the lines 5—5 of Figure 3, the lock and a portion of the anticreep means being shown in elevation and in locked position.
Figure 6:
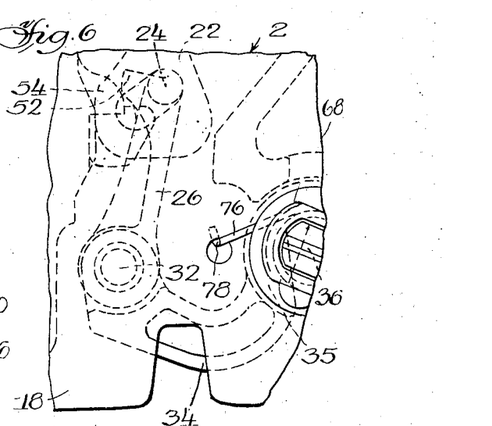

Referring now to Figure 5 wherein the lock is shown in lowered locking position, upon rotation of the rotor shaft 36 in a clockwise direction the lug 50 will cause the lever 34 to be pivoted forwardly and upwardly to effect upward sliding movement of the trunnion 24 of the link 26 in the slot 28 in the lock leg. Upon abutment with the upper end of the slot, as shown in Figures 6 and 7, the trunnion 24 will move the lock upwardly and laterally to disengage the anticreep lug 52 on the toggle normally underlying the laterally extending lug or foot 54 on the front wall 14 to hold the lock in knuckle-locking position, whereby the lock will be raised out of locking engagement with the knuckle 8 in well known manner, Figure 7 illustrating the position of the parts with the lock being raised, and Figure 6 illustrating the position of the parts with the anticreep out of engagement and the lock partially raised toward the unlocked position. It will be clearly apparent that rotation of the rotor shaft 36 in a counterclockwise direction will cause a reversal of movements of the lever 34 and link 28 and thereby lower the lock into locking engagement with the knuckle with the anticreep lug 52 lying underneath the foot 54, as in Figures 4 and 5.

Figure 9:
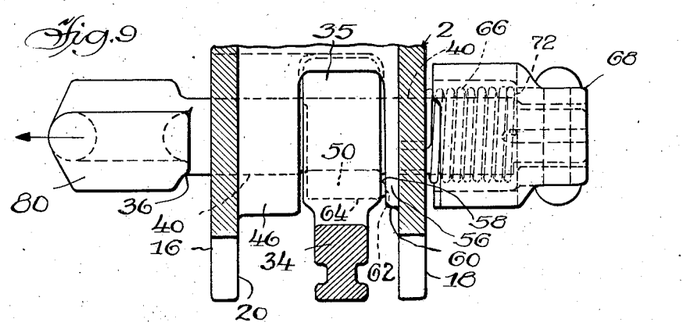
Figure 10:
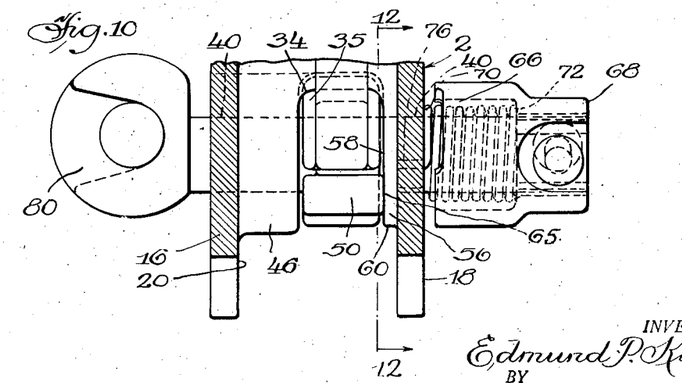
Figure 11:
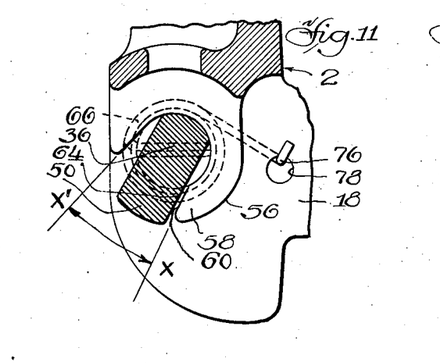
Figure 11 is a sectional view taken in the vertical plane indicated by the line 11—11 of Figure 8, said view illustrating the lock-to-the-lock in engagement and preventing rotation of the rotor.
Figure 12:
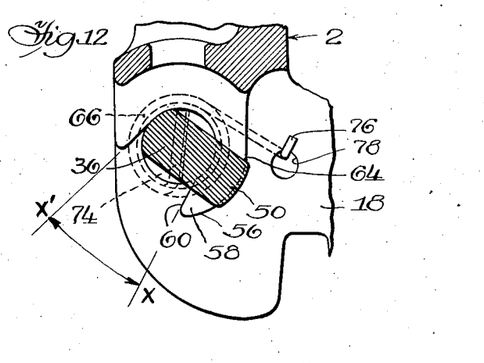
Figure 12 is a sectional view taken in the vertical plane indicated by the line 12—12 of Figure 10, said view illustrating the lock-to-the-lock disengaged and the rotor rotated to unlock the coupler.

To maintain the rotor in locked position whereby the locking parts will be held in their down coupler locking position, it will be seen in Figures 8-12 that the side wall 18 of the coupler head casting is formed with a lug or boss 56 on the inner surface thereof, said boss having an opening extending from X to X', as in Figures 11 and 12, to receive the end of lug 50 when in locked position, as shown in Figure 11, wherein the side 64 of the lug 50 on the rotor 36 engages the shoulder 60 of the boss 56 when in lock-to-the-lock position preventing rotation of the rotor and unlocking of the coupler until the rotor 36 is pulled out of engagement, as in Figures 10 and 12, in which the rotor is pulled out and rotated. In such position the end 62 of the lug 50 rides on the surface 58 of the boss 56. The rotor shaft 36 extends outwardly of the side walls 16 and 18 and a coil spring 66 is sleeved over one end thereof, said spring being received within a spring cap 68 secured to the shaft 36 by a rivet extending through aligned openings in the same and the cap. The spring 66 is seated at opposite ends thereof against the side wall 18 as at 70 and the spring cap 68 as at 72 under compression therebetween for urging the lug 50 toward the boss 56 so that the surface 62 of the lug 50 will be engaged as at 65 with the surface 58 of the boss 56 on the wall 18 when the lever 34, link 28, and lock 12 are in their raised position, that is, the lock-to-the-lock is in released position and the lock is in knuckle unlocking position, as shown in Figures 6, 7, 10 and 12.

Thus the lug 50 and the shoulder 60 of the boss 56 afford anticreep means preventing accidental creeping rotation of the rotor and lifter during bouncing of the coupler under service conditions.

Figure 14:
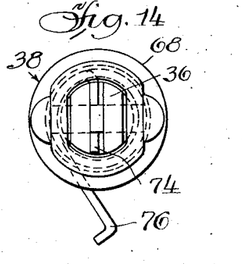

As seen in Figure 14, the one end of the spring, in abutment with the spring cap 68, has its extremity 74 received within aligned openings extending transversely of the shaft and spaced from the rivet securing the cap and shaft together. The opposite end of the spring extends laterally of the shaft 34 and is formed at its extremity with a bent portion 76 received within an opening in the wall 18 as at 78, said portion 76 being inwardly turned to engage the inner surface of the wall 18 to prevent disengagement therefrom in the released position of the parts, as shown in Figures 10 and 12. It will thus be seen that the ends of the spring are secured respectively to the shaft 36 and the wall 18 so that upon rotation of the rotor shaft the spring will be placed in torsion. To rotate the rotor shaft 36 and also to maintain the spring 66 under compression, the one end of said shaft is provided with a loop portion 80 normally in abutment with the wall 16 of the coupler for receiving an uncoupling rod (not shown) and which may have its outer end disposed in a position at the side of the cars permitting actuation thereof by the train man without going between the cars.

In the released position of the lock, the surfaces 58 and 62 of the lug 50 and boss 56 are in engagement as at 65 and upon movement of the rotor shaft 36 in a counterclockwise direction (Figures 6 and 7) to position the lock 12 in locking engagement with the knuckle 8 and thereby the anticreep lug 52 on the leg in engagement with the foot 54 on the front wall 14, the lug 50 on the rotor shaft 36, will slide along the boss 56 on the wall 18 until the lug 50 overrides the boss 56 and is moved laterally toward the wall 18 for engagement therewith by the action of the spring 66. As the ends of the spring are secured to the shaft 36 and the wall 18, rotation of the shaft as described will wind the spring to place the same in torsion, whereby the resultant torsional pressure will tend to return the spring to its original position and thereby position the surface 64 of the lug 50 in locking engagement with the surface 60 of the boss 56, as clearly shown in Figures 8 and 11. It will be understood that although the compression of the spring sets up some friction against the turning of the rotor, this will be offset by the torsional action of the spring to turn the rotor to locked position with the surfaces 64 and 60 of the lug 50 and boss 56, respectively, in engagement. The spiral spring thus serves to overcome friction of the parts in locking by the turning action imparted to the rotor and maintains the lock-to-the-lock lugs in engagement.

To release the lock-to-the-lock afforded by the engagement of the lug 50 and the boss 56, a translatory motion is imparted to the rotor shaft 36 by pulling the same in the direction indicated by the arrow in Figure 9 against the pressure of the spring 66 to disengage the surface 64 of the lug 50 from the shoulder or surface 60 of the lug or boss 56.

It will be apparent from the foregoing description that my novel lock-to-the-lock device will positively hold the lock down when in coupled and in locked position and maintain this condition until release of the lock is desirable.

It may be noted that in the locked position of the parts shown in Figures 4 and 5 and described above, the side walls 16 and 18 of the coupler head have openings therein for the observation of the position of the lifter in its raised and lowered positions, the openings thus serving as telltale means to afford visual indication of the fact that the lock is in the locked position.

Figures 15, 16, 17:
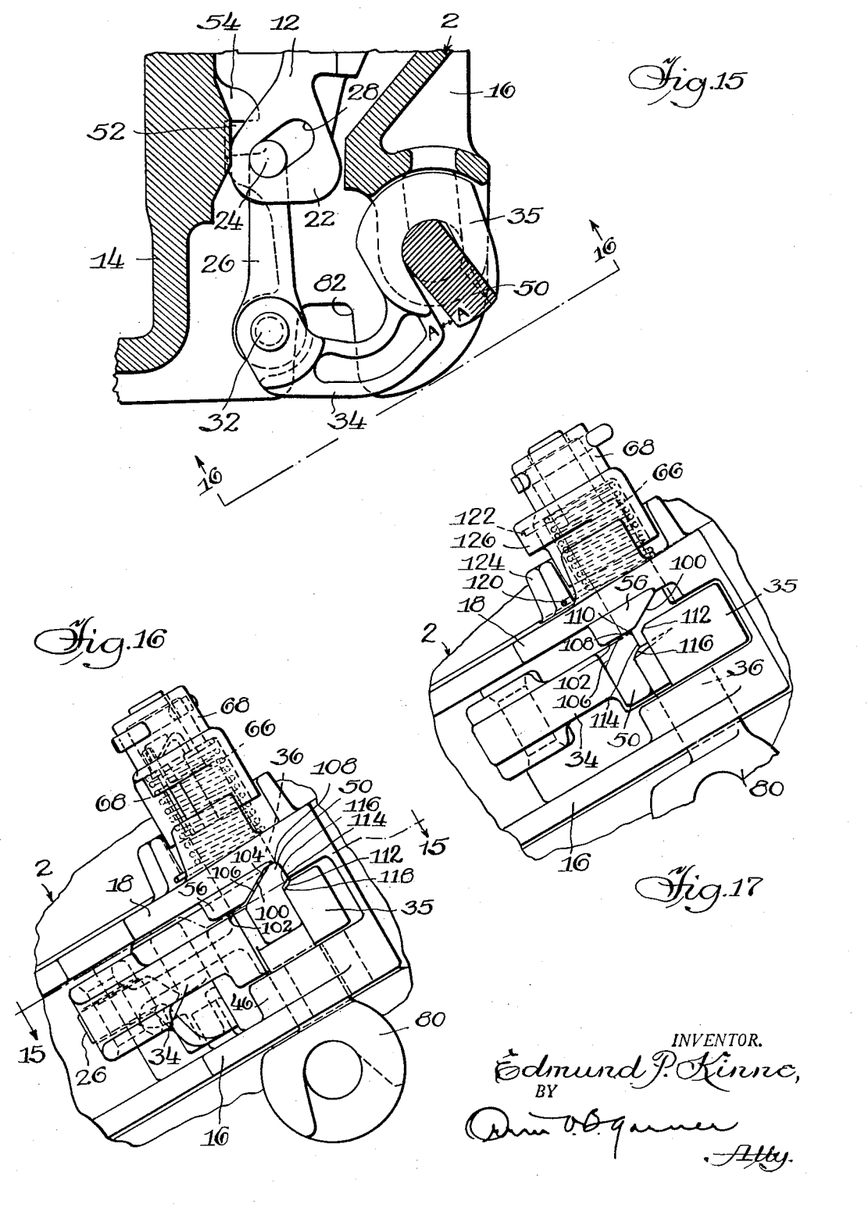
Figures 15, 16 and 17 are views illustrating a modification of the invention, Figure 15 being a view similar to Figure 5 and shown as a section taken on line 15—15 of Figure 16, and Figures 16 and 17 being views taken in the plane indicated by the line 16—16 of Figure 15, Figures 15 and 16 illustrating the position of the parts in locked position and Figure 17 in unlocked position.

The modification of the invention illustrated in Figures 15–17 inclusive is substantially identical with the structure previously described and as shown in Figures 1–14 inclusive, and for that reason similar reference characters have been utilized to identify like parts of the structure, other reference characters indicating portions of the device illustrating modified structure.

In the arrangement illustrated in Figures 1–14 inclusive, it is necessary for the train man to disengage the lug 50 from the boss 56 to release the lock-to-the-lock by pulling the rotor shaft 36 sidewise against the resistance afforded by the compression of the spring 66 acting to urge the shaft 36 in an opposite direction. The modification of the invention illustrated in Figures 15–17 contemplates an arrangement wherein rotation of the rotor releases the lock-to-the-lock and dispenses with necessity of the train man pulling the rotor shaft 36 sidewise to disengage the lock-to-the-lock. To this end, the lug or boss 56 on the side wall 18 of the coupler head is formed on the inner surface thereof with a sloping cam surface 100 at one side thereof and a flat surface 102 on a side thereof angularly arranged with respect to the surface 100, said surface 100 having engagement as at 104 with a complementary cam surface 106 on one side of the adjacent extremity of the lug 50 of the rotor shaft 36 in the locking position of the lock-to-the-lock, as shown in Figure 16, and said surface 102 having sliding engagement as at 108 with a complementary surface 110 on the lug 50 in the unlocked position of the lock-to-the-lock as shown in Figure 17, the complementary surfaces of said lug 50 and boss 56 being urged into said engagements by the compressive action of the spring 66 causing longitudinal movement of the shaft 36 toward the wall 18 of the coupler head.

Referring to Figure 16, it will be apparent that in releasing the lock-to-the-lock, the rotor shaft 36 need merely be rotated in a clockwise direction to cause the surface 106 of the lug 50 of the rotor shaft to slide along the surface 100 on the boss 56 on the wall 18 until the surfaces 102 and 110 of said boss and lug are engaged at 108 as shown in Figure 17 illustrating the released position of the lock-to-the-lock, thereby dispensing with the necessity of the train man pulling the rotor sidewise to disengage the lock-to-the-lock.

It may be noted that in the position of the parts illustrated in Figure 16, the jaw 35 of the lifter 34 is formed with a sloping surface 112 substantially parallel to the engaged surfaces 100 and 106 of the lug 50 and boss 56 respectively, and the back of the lug 50 of the shaft 36 has been relieved on the rear side so as to form the shoulder 114 having a surface 116 in complementary engagement as at 118 with the surface 112 of the jaw 35. Upon rotation of the rotor shaft 36 in a counterclockwise direction to its locking position and movement of the same toward the wall 18 by the force of the spring 66, the surfaces 112 and 116 will be engaged as at 118 so that the rotor shaft 36 can not be pulled sidewise but must be rotated to disengage the surfaces 112 and 116.

To permit the engagement of the surfaces 112 and 116 for the purpose described the lug 50 of the rotor shaft 36 is loosely fitted in the jaw 35 of the lifter 34 so that sufficient play (indicated at A—A, Figure 15) will be afforded to allow sidewise movement of the rotor shaft 36 relative to the lifter jaw 35 so that the shoulder 114 may over-ride the adjacent end portion of the jaw 35 to permit the engagement of the aforesaid surfaces.

It may be noted that the spring 66 sleeved over the end of the rotor shaft 36 is placed in tension to facilitate rotation of the shaft in a counterclockwise direction to its locking position by the opposite ends 120 and 122 of the spring respectively bearing against a lug 124 formed on the outer surface of the wall 18 of the coupler head and also against a laterally projecting portion 126 on the spring cap 68.

It will be apparent that in the arrangement illustrated in Figures 15–17 the releasing of the lock-to-the-lock and the raising of the lock to the lockset position is combined into one operation of rotating the outboard handle of the uncoupling rod (not shown) attached to the rotor in the coupler.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a coupler, a coupler head, a lock therewithin, a lifter, a link pivotally connected to said lock and said lifter, a rotor supported by spaced walls of said head and connected to said lifter, said rotor being movable transversely of said walls and having its ends projecting therefrom, a lug on said rotor between said walls, a lug on one of said walls engageable with said rotor lug for preventing rotation of said rotor in the locking position of said lock, a spring cap secured to one end of said rotor, a coil spring sleeved over said rotor and compressed between said last-mentioned wall and said cap for moving said rotor transversely of said walls and thereby said lugs into engagement, and actuating means on said rotor at the other end thereof for rotating said rotor and to move the same transversely of said walls in the opposite direction to disengage said lugs, said spring having its ends bearing against said spring cap and the adjacent wall and being in torsion therebetween to facilitate movement of said lock into locking position.

2. In a coupler, a coupler head, a lock therewithin, a lifter, a link pivotally connected to said lock and said lifter, a rotor supported by spaced walls of said head and connected to said lifter, said rotor being movable transversely of said walls and having its ends projecting therefrom, a lug on said rotor between said walls, a lug on one of said walls engageable with said rotor lug for preventing rotation of said rotor in the locking position of said lock, a coil spring sleeved over one end of said rotor and under compression between abutment means thereon and said last-mentioned wall for urging said rotor transversely of said walls in one direction and thereby said lugs into engagement, and actuating means on said rotor at the other end thereof for rotating said rotor and for moving the same transversely of said walls in the opposite direction to disengage said lugs, said spring being secured to said rotor and to the adjacent wall in torsion therebetween to facilitate movement of said lock into locking position.

3. In a coupler, a coupler head, a lock therewithin, a lifter, a link pivotally connected to said lock and lifter, a rotor supported by spaced walls of said head and connected to said lifter, said rotor extending through said walls and being movable transversely thereof, means on said rotor engageable with means on one of said walls for preventing rotation of said rotor in the locking position of said lock, a spring sleeved over one end of said rotor and secured thereto and to said last-mentioned wall and under compression therebetween to move said rotor transversely of said walls in one direction to urge both of said means into engagement, and actuating means on said rotor for rotating said rotor and for moving the same transversely of said walls in the opposite direction to disengage said first and second-mentioned means, said spring being in torsion to facilitate movement of said lock into locking position.

4. In a coupler, a coupler head, a lock therewithin, a lifter, a link pivotally connected to said lock and lifter, a rotor supported by said head and connected to said lifter, said rotor extending through said head and being movable transversely thereof, interengaging means on said rotor and said head within said head for preventing rotation of said rotor in the locking position of said lock, resilient means compressed between said head and one end of said rotor for urging said first-mentioned means into engagement, and means on the other end of said rotor for rotating said rotor and to disengage said first-mentioned means against the action of said resilient means, said head having openings at opposite sides thereof affording visual indication of the position of said lifter.

5. In a coupler, a coupler head, a lock therewithin, a rotor operatively connected to said lock and journaled in said head, a lug on said rotor engageable with a lug on said head within the latter for preventing rotation of said rotor in the locking position of said lock, a spring under compression between abutment means on said rotor and said head externally of the latter for urging said lugs into engagement, and means on said rotor for rotating the same and for disengaging said lugs against the action of said spring, said spring being secured to said rotor and said head whereby rotation of said rotor in one direction and movement of said lock into unlocking position places said spring in torsion to facilitate rotation of said rotor in the opposite direction and movement of said lock into locking position.

6. In a coupler, a coupler head, a lock therewithin, a lifter, a link pivoted to said lock and said lifter, a rotor extending through spaced walls of said head, and movable transversely thereof, means on said rotor between said walls and on one of said walls in engagement for preventing rotation of said rotor in the locking position of said lock, a spring sleeved over one end of said rotor and secured thereto and to said last-mentioned wall and under compression therebetween for moving said rotor transversely of said walls and said means into engagement, and actuating means on said rotor for rotating said rotor to move the same transversely of said walls in the opposite direction to disengage said means.

7. In a coupler, a coupler head, a lock therewithin, a lifter, a link pivoted to said lock and lifter, a rotor extending through spaced walls of said head and movable transversely thereof, interengaging means on said rotor and one of said walls for preventing rotation of said rotor in the locking position of said lock, resilient means under compression between abutment means on said rotor at one end thereof and said last-mentioned wall to urge said rotor transversely of said walls in one direction and thereby said first-mentioned means into engagement, and means on said rotor for rotating the same and pulling said rotor transversely of said walls in the opposite direction against the action of said resilient means to disengage said interengaging means.

8. In a coupler, a coupler head, a lock therewithin, a lifter, a link pivotally connected to said lock and lifter, a rotor extending through spaced walls of said head and movable transversely thereof, interengaging means on said rotor and one of said walls for preventing rotation of said rotor in the locking position of said lock, a spring compressed between abutment means on said rotor at one end thereof and said last-mentioned wall for moving said rotor transversely of said wall and thereby said first-mentioned means into engagement, means on said rotor for rotating said rotor and moving said rotor in an opposite direction to disengage said interengaging means, and telltale openings in said walls affording visual indication of the position of said lifter.

9. In a coupler, a coupler head, a lock therewithin, a lifter, a link pivotally connected to said lock and lifter, a rotor supported by said head and connected to said lifter, said rotor extending through said head and being movable transversely thereof, interengaging means on said rotor and said head within said head for preventing rotation of said rotor in the locking position of said lock, resilient means compressed between said head and one end of said rotor for urging said first-mentioned means into engagement, and means on the other end of said rotor for rotating said rotor to disengage said first-mentioned means against the action of said resilient means.

10. In a coupler, a pivoted knuckle, a lock therefor, anticreep means on said lock engageable with stop means on said coupler, a rotor operatively connected to said lock for raising and lowering the same to unlocked and locked positions respectively, interlocking means on said rotor and said coupler for maintaining said anticreep in position for engagement with said stop means, resilient means connected to said rotor and said coupler and compressed therebetween for urging said interlocking means into said engagement and for maintaining the same in said engagement, and actuating means associated with said rotor to operate the same and to disengage said interlocking means against the pressure of said resilient means.

11. In a coupler, a coupler head, a lock therewithin, a lifter, a link pivotally connected to said lock and lifter, a rotor extending through spaced walls of said head and movable transversely thereof, interengaging means on said rotor and one wall of said head for preventing rotation of said rotor in the locking position of said lock, a spring compressed between said last-mentioned wall and abutment means on said rotor at one end thereof for maintaining said first-mentioned means in engagement, and means on said rotor at the other end thereof for rotating the same and disengaging said first-mentioned means against the action of said spring.

12. A coupler comprising a head, a knuckle pivoted thereto, a lock in said head movable into and out of locking engagement with the knuckle, a lifter rotatably mounted on the head and operatively connected to the lock, a rotor operatively connected to the lifter, interlocking means on the rotor and lifter limiting relative rotational movement therebetween and accommodating movement therebetween parallel to the axis of rotation of said rotor, cooperating anticreep elements on said rotor and head, and spring means reacting against said head and said rotor for yieldingly urging said elements into engagement and for yieldingly resisting movement of said rotor parallel to its axis of rotation to disengage said elements.

13. In a coupler, a coupler head, a lock therewithin, a rotor supported by said head and operatively connected to said lock, elements on said rotor and said head engageable to prevent rotation of said rotor in the locking position of said lock, a spring compressed between and secured to said head and said rotor for urging said elements into engagement, rotation of said rotor to move said lock to unlocking position placing said spring in torsion to facilitate movement of said lock into locking position, and means for rotating said rotor and to disengage said elements against the compressive action of said spring.

14. In a coupler, a coupler head, a lock therewithin, a rotor mounted in said head and operatively connected to said lock, means on said rotor and said head engageable to prevent rotation of said rotor in the locking position of said lock, a spring secured to said head and said rotor under compression therebetween operatively urging said first-mentioned means into engagement, and means for rotating said rotor and to disengage said first-named means against the action of said spring, said spring being maintained in torsion to facilitate movement of said lock into locking position.

15. In a coupler, a coupler head, a lock therewithin, a rotor journaled in said head and operatively connected to said lock, interengaging means on said head and rotor for preventing rotation of said rotor in the locking position of said lock, resilient means on said rotor and compressed between said head and said rotor externally of said head for urging said first-mentioned means into engagement, and actuating means on said rotor for rotating the same to disengage said first-mentioned means against the action of said resilient means.

16. In a coupler, a coupler head, a lock therewithin, a rotor journaled in said head and operatively connected to said lock, interengaging means on said rotor and said head within the latter for preventing rotation of said rotor in the locking position of said lock, resilient means compressed between abutment means on said rotor and said head for urging said means into engagement, and means for rotating said rotor to disengage said interengaging means against the action of said resilient means.

17. A coupler comprising a head, a knuckle pivoted thereto, a lock movable into and out of locking engagement with the knuckle, a rotor rotatably mounted on the head, a lifter connected to the rotor for rotation therewith, a link pivoted to the lifter and to the lock for actuation thereof, and cooperating anticreep elements on the rotor and head engageable to afford anticreep means in the locked position of said lock preventing accidental rotation of the rotor and lifter, said elements being disengageable by movement apart in a direction axially of the rotor.

18. In a coupler, a coupler head, a lock therewithin, a rotor operatively connected to said lock and journaled in said head, an element on said rotor engageable with an element on said head within the latter for preventing rotation of said rotor in the locking position of said lock, a spring under compression and in torsion between abutment means on said rotor and said head externally of the latter for urging said elements into engagement, and means on said rotor for rotating the same and for disengaging said elements against the action of said spring.

19. In a coupler, a coupler head, a lock therewithin, a rotor mounted in said head and operatively connected to said lock, elements on said rotor and said head engageable to prevent rotation of said rotor in the locking position of said lock, resilient means compressed between said head and abutment means on said rotor for urging said elements into engagement, and means for rotating said rotor to disengage said elements.

20. In a coupler, a coupler head, a lock therewithin, a rotor operatively connected to said lock, elements on said rotor and said head engageable to prevent rotation of said rotor in the locking position of said lock, and resilient means operatively urging said elements into engagement.

21. A coupler comprising a head, a knuckle pivoted thereto, a lock movable into and out of locking engagement with the knuckle, a rotor rotatably mounted on the head, a lifter connected to the rotor for rotation therewith, a link pivoted to the lifter and to the lock for actuation thereof, and cooperating anticreep elements on the rotor and head engageable to afford anticreep means in the locked position of said lock preventing accidental rotation of the rotor and lifter, said anticreep elements on the rotor and head being disposed at one side of the axis of rotation of said rotor and said rotor being movable along its axis of rotation to engage and disengage said elements.

22. A coupler comprising a coupler head, a knuckle pivoted thereto, a lock movable to locked and unlocked positions with respect to said knuckle, a support member carried by said head, an opening through said member, a rotor member rotatably mounted in said opening and operatively connected to the lock for actuation thereof, abutment surfaces on respective members, resilient means reacting against the head and against the rotor member for urging said rotor member to the engaging position of said surfaces, a slot in one of said surfaces and a lug on the other surface receivable within said slot and yieldingly held therein by said resilient means in the locked position of said lock.

23. A coupler, according to claim 22, wherein the lug and a margin of the slot are provided with cooperating cam faces engageable when said lug is received within said slot, the cam faces being angularly related to the abutment surfaces whereby rotation of the rotor is operable to move the lug outwardly from said slot along said faces.

24. In a coupler structure comprising a head, a knuckle pivoted thereto, a lock in said head movable to locked and unlocked positions with respect to said knuckle, and a rotor rotatably mounted on the coupler and operatively connected to the lock; the combination of anticreep elements on the rotor and head engageable to prevent accidental rotation of the rotor in the locked position of said lock, and resilient means carried by said structure for urging said rotor axially along its axis of rotation to the engaging position of said elements.

25. In a coupler, a coupler head, a knuckle pivoted therein, and a lock movable into and out of locking engagement with said knuckle; the combination of a rotor carried by said head, an operative connection between said rotor and said lock for actuation thereof, and an abutment on said rotor engageable with an abutment on said head to limit rotation of said rotor, thereby affording a lock-to-the-lock, said rotor being movable longitudinally thereof to disengage the abutment thereon from the coupler head abutment, thereby accommodating rotation of said rotor to actuate said lock.

26. A coupler comprising a head, a knuckle carried thereby, a lock movable into and out of locking engagement with the knuckle, a rotor rotatably mounted on the head, a lifter connected to the rotor for rotation therewith and operatively connected to the lock for actuation thereof, and cooperating anticreep elements on said head and rotor provided with cam surfaces sloping toward said lifter and engageable with each other in the locked position of the lock to prevent accidental rotation of the rotor, the element on said rotor comprising a surface engageable with said lifter in the locked position of the lock to limit axial movement of said rotor in a direction disengaging said surfaces.

27. A coupler head comprising spaced side walls provided with journal openings for supporting a lock rotor, and an anticreep element on the interior side of one of said walls partially surrounding the associated journal opening.

28. A coupler head comprising spaced side walls provide with coaxial journal openings for supporting a lock rotor, and an anticreep lug between said walls formed integral with one thereof around the adjacent opening and having a slot extending substantially radially with respect to the axis of said openings.

29. A coupler head comprising spaced parallel, generally vertical side walls for supporting a lock rotor, an anticreep lug between said walls integrally formed on one thereof, and a substantially vertical cam surface on said lug extending diagonally with respect to said walls.

30. A rotor for a coupler lock comprising a shaft and a lug on said shaft for interlocking the shaft with an associated lock member, said lug comprising a substantially flat bearing surface facing toward one end of the shaft and extending substantially perpendicular to said shaft and another surface on said lug extending diagonally with respect to the plane of said surface and merging therewith.

31. A rotor for a coupler lock comprising a shaft with a bearing surface thereon extending generally perpendicular to the axis of said shaft, and a cam surface on said shaft extending angularly with respect to said bearing surface and disposed between the same and said axis.

32. In a coupler, a head, a rotor rotatably mounted thereon, a lock for said head operatively connected to the rotor, lock-to-the-lock means on said head and said rotor engageable to prevent rotation of the latter in the locked position of the lock, said rotor being movable along its axis of rotation and having means thereon cooperating with means on said head during such movement for urging said rotor to a position disengaging said lock-to-the-lock means, thereby accommodating rotation of said rotor for unlocking said lock.

EDMUND P. KINNE.

REFERENCES CITED

The following references are of record in the file of this patent:

UNITED STATES PATENTS

| Number | Name | Date |
| --- | --- | --- |
| 566,521 | Leger | Aug. 25, 1896 |
| 639,899 | Keusink | Dec. 26, 1899 |
| 2,000,435 | Bazeley | May 7, 1935 |
| 2,153,886 | Grayson | Apr. 11, 1939 |
| 2,393,914 | Kinne | Jan. 29, 1946 |
| 2,399,263 | Schlesinger | Apr. 30, 1946 |
| 2,408,653 | Kinne | Oct. 1, 1946 |